Jan. 2, 1951     E. A. ROCKWELL     2,536,140
PRESSURE CONVERTER MEANS

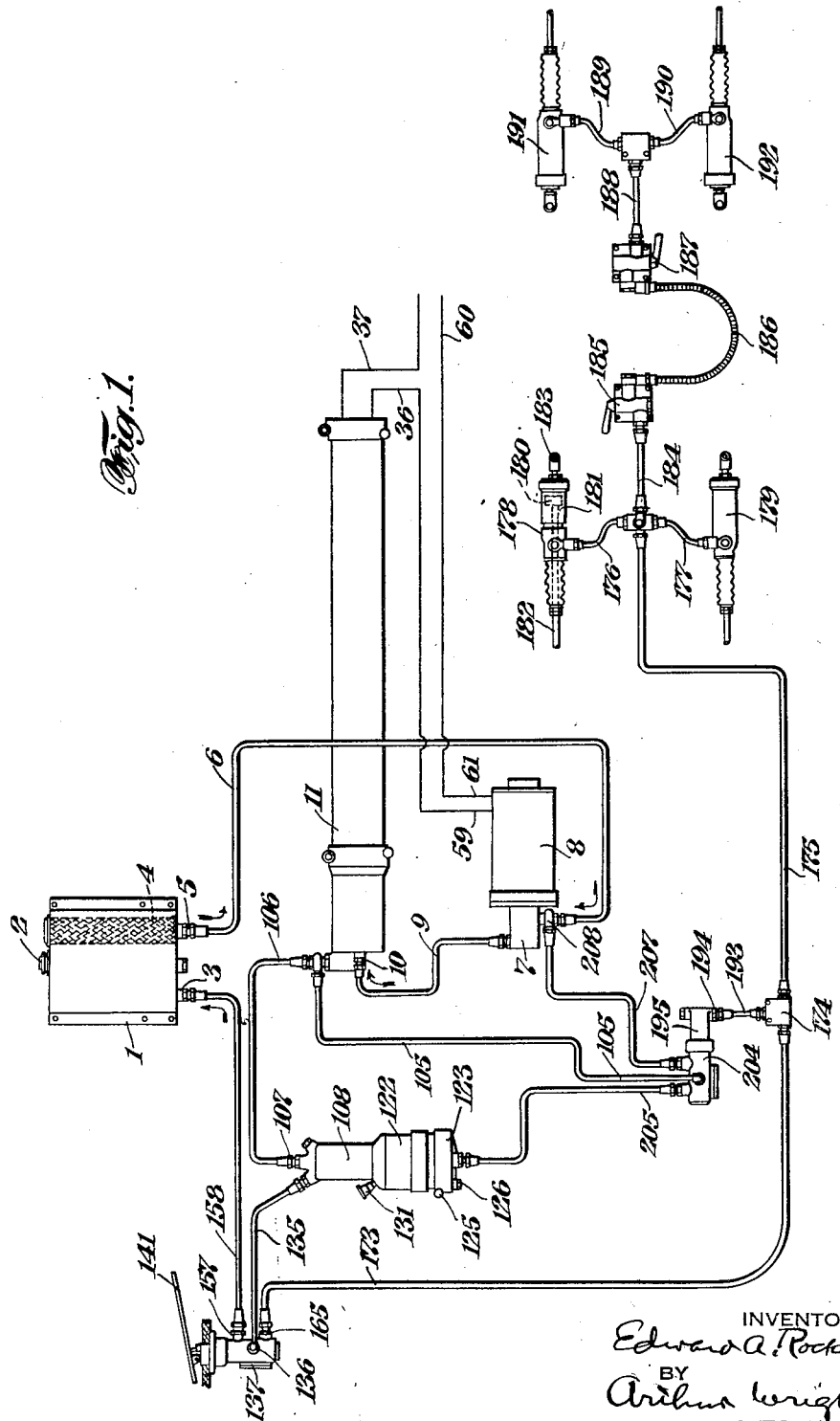

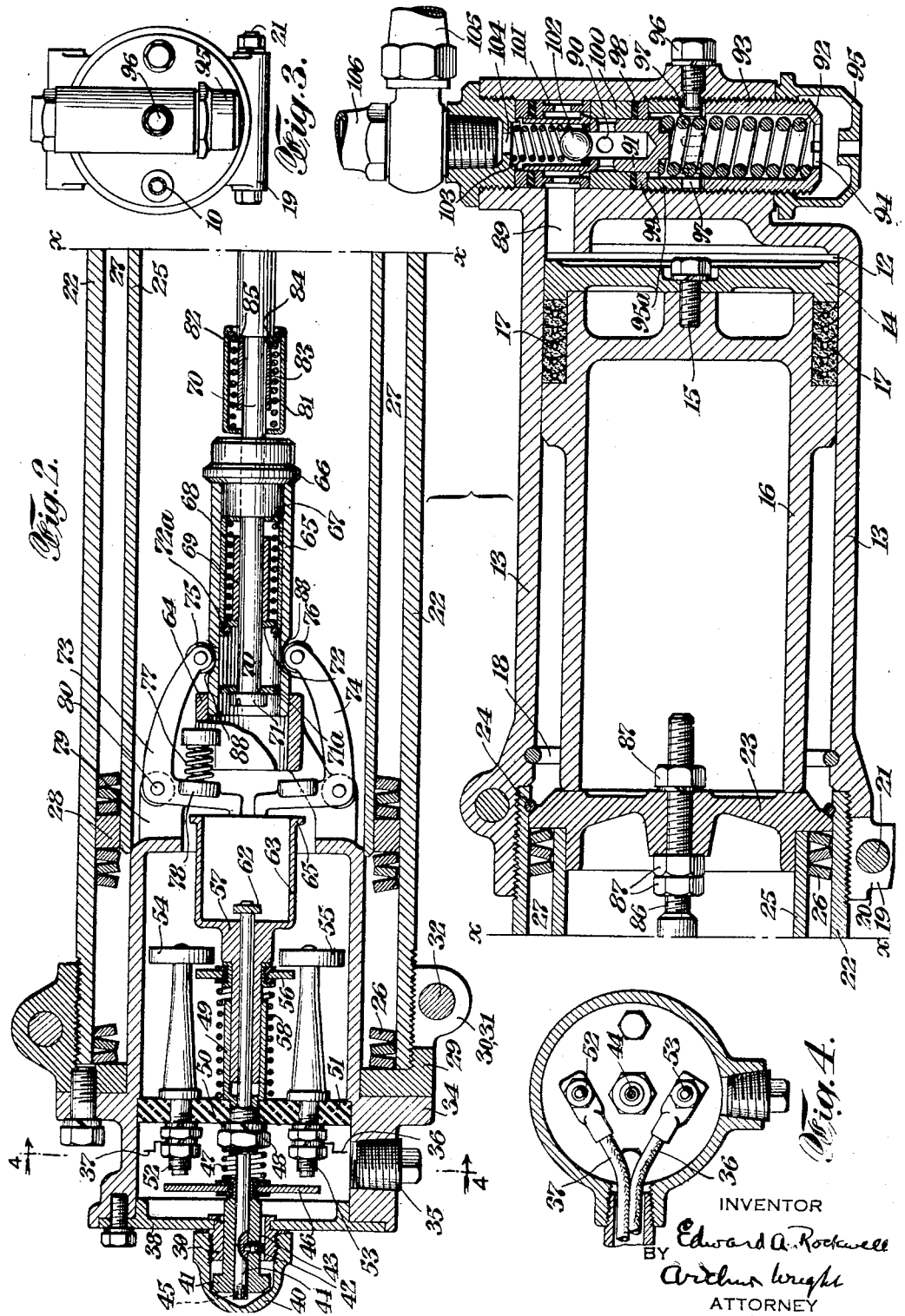

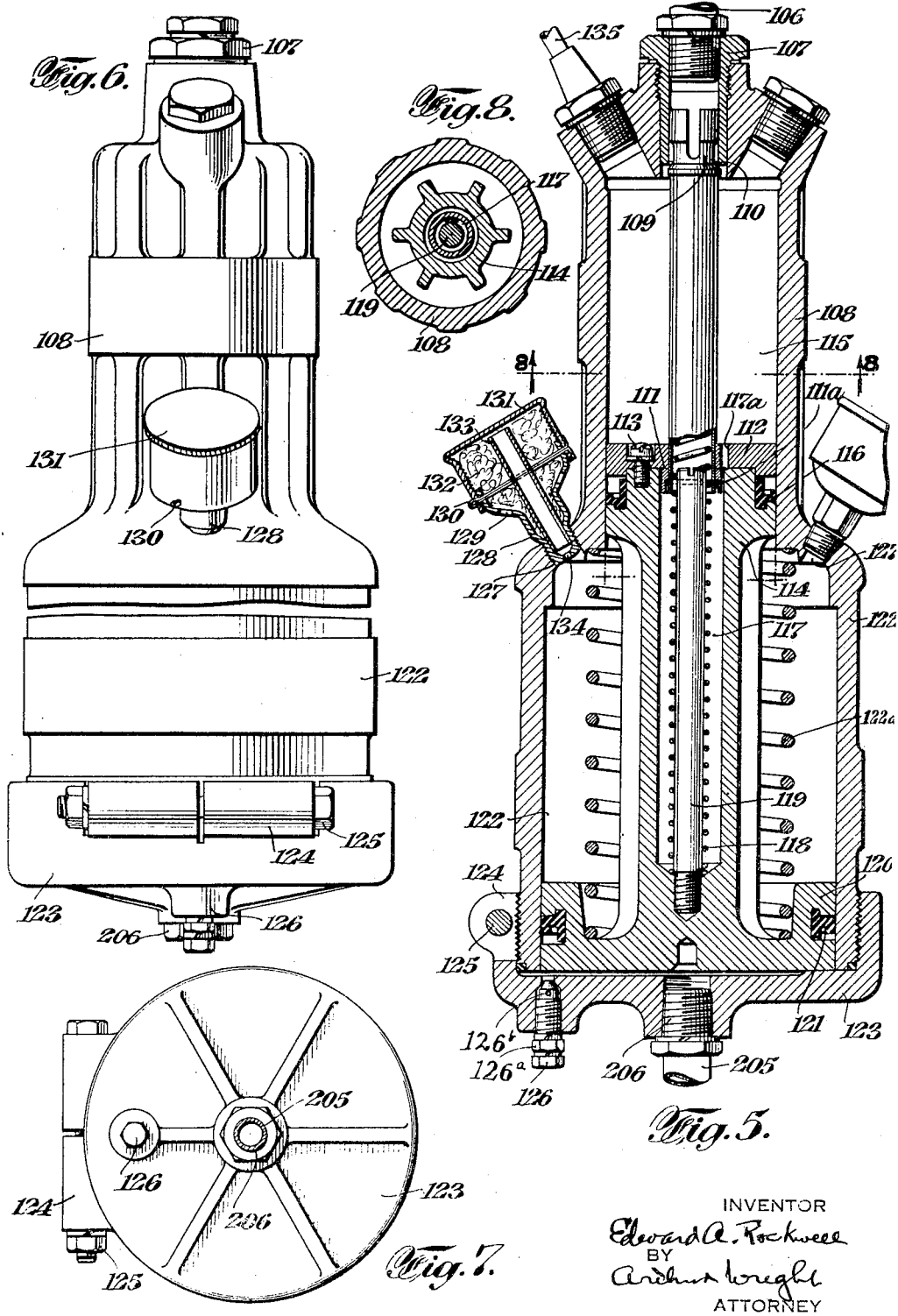

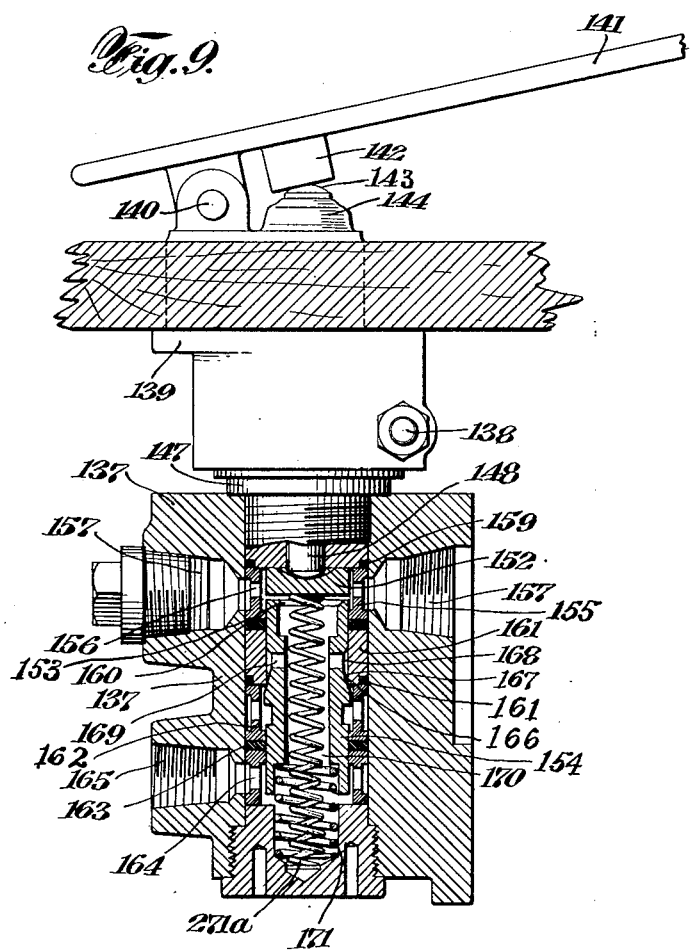

Original Filed Jan. 4, 1940     5 Sheets-Sheet 5

INVENTOR
Edward A. Rockwell
BY
Arthur Wright
ATTORNEY

Patented Jan. 2, 1951

2,536,140

UNITED STATES PATENT OFFICE 2,536,140

PRESSURE CONVERTER MEANS

Edward A. Rockwell, Cleveland, Ohio

Application February 17, 1943, Serial No. 476,248, now Patent No. 2,410,750, dated November 5, 1946, which is a division of application Serial No. 312,356, January 4, 1940, now Patent No. 2,331,800, dated October 12, 1943. Divided and this application April 6, 1944, Serial No. 529,868

8 Claims. (Cl. 60—54.5)

My invention relates particularly to an apparatus for controlling the application of power involving pressure converter means for the operation of different parts or accessories of automotive vehicles, as for example automobiles, aeroplanes, railroad cars, mine locomotives, etc.

This application is a division of my copending application Ser. No. 476,248, filed February 17, 1943, upon Controlling System for the Application of Power, now Patent No. 2,410,750, which was a division of my application Ser. No. 312,356, filed January 4, 1940, upon System for Controlling the Application of Power, now Patent No. 2,331,800, granted October 12, 1943.

The object of my invention is to provide converter means which may be used in systems of the above character. Another object is to provide means for converting one pressure to another, as for instance low pressure to high pressure. My invention is adapted to be applied, not only for the operation of heavy-duty parts, as for instance on heavy trucks, requiring a considerable volume of pressure fluid for the operation of the same but also for the operation of relatively light parts on aeroplanes and other automotive vehicles, such for instance as light trucks, etc. Still another object is to provide an unloader valve. Another object is to provide a converter valve. Further objects of my invention will appear from the detailed description of the same hereinafter.

While my invention is capable of embodiment in many different forms, I have shown only certain embodiments thereof in the accompanying drawings, in which—

Fig. 1 is a diagrammatic elevation of a system made in accordance with my invention, adapted for heavy duty, involving the application of a modulated low pressure and so as to apply thereafter a modulated high pressure;

Fig. 2 is a vertical section of an accumulator for pressure adapted to be used therewith;

Fig. 3 is an end elevation of the same;

Fig. 4 is a vertical section through the same on line 4—4 of Fig. 2;

Fig. 5 is a vertical section of a pressure converter adapted to be used therewith;

Fig. 6 is an elevation of the same;

Fig. 7 is a plan view of the same;

Fig. 8 is a cross-section of the same taken on line 8—8 of Fig. 5;

Fig. 9 is a longitudinal section of one of the modulator valves;

Figure 10:
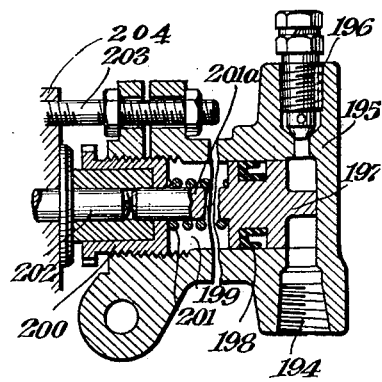
Fig. 10 is a vertical section of a converter valve.
Figure 11:
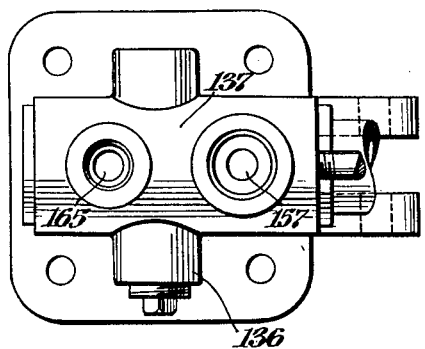
Fig. 11 is a plan view of an upper portion of the manual valve control casing.
Figure 12:
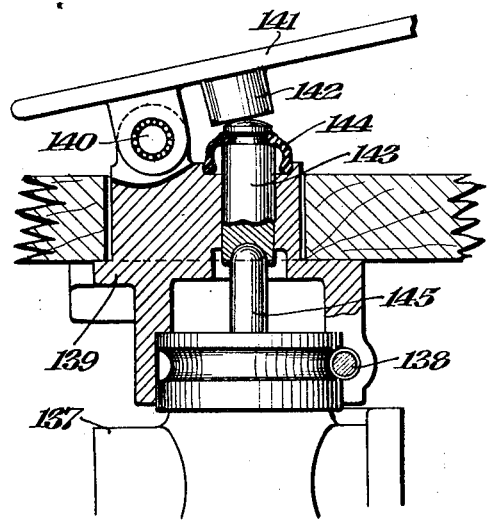
Fig. 12 is a vertical section through the same.

Referring first to the form of my invention shown in Fig. 1, a system is provided for first applying a modulated low pressure and for thereafter controlling the application of a modulated high pressure thereby.

There is provided therein a reservoir gravity-feed tank 1 having a filler opening 2, an inlet 3 for the returned discharged liquid, which may be a hydraulic brake fluid or any other suitable liquid, and a removable cylindrical screen filter 4 located over an outlet or supply opening 5 which leads by a pipe 6 to a rotary pump 7 which may, for example, be any desired type of gear pump. This is driven by an electric motor 8.

Pressure liquid is thus supplied from the pump 7 by a pipe 9 to an inlet 10 on a pressure accumulator 11. The pressure fluid from the pump 8 is thus received in a chamber 12 in a cylinder 13 so as to force to the left in Fig. 2, a piston 14 which is mounted by means of a screw 15 on a plunger 16 between which piston 14 and plunger 16 there is a chevron packing 17, of suitable material. A snap control stop 18 for the plunger 16 is located at the left of the cylinder 13, which latter is screw-threaded, and provided with a pair of ears 19 and 20 secured together with a bolt 21, for screw-threaded attachment to a spring casing 22. The said plunger 16 rests against the face of a spring retainer plate 23. The spring casing 22 also has a split ring stop 24 for the retainer plate 23, which is also provided with an internal sleeve 25 to act as a guide for a plurality of Belleville spring washers 26 which are merely dished rings of spring steel. As shown in the drawings, the said rings 26 are located so that the adjacent rings have their dished portions extending in opposite directions, said rings being thus carried in an annular chamber 27 between the casing 22 and the guide 25 at intervals along the chamber 27. Between groups of the spring washers 26 there are ring-shaped blocks 28 to aid in maintaining the alignment of the spring washers 26. The left end of the chamber 27 is closed by a screw-threaded cap 29, having a pair of ears 30 and 31, screw-threaded to the spring casing 22 and clamped together by a bolt 32. Bolted to the left face of the cap 29 there is a cylindrical switch housing 34, which extends inwardly within the washer 26, the same having a removable screw-plug 35 to permit access to the switch terminals for leads 36 and 37 leading to the switch terminals. A cover plate 38 is bolted to the switch housing 34. In said cover plate 38 there is a sleeve 39 having a screw-threaded cap 40 to hold in place a sleeve 41 which has a screw 42 adapted to be received in a slot 43 in the sleeve 39. Said screw 42 also fastens in position an adjustable switch supporting rod 44 provided with a screw-threaded hole 45 to aid in the removal thereof. Slidably mounted on the rod 44 there is a copper plate 46 which operates as a starting switch in the initial starting or setting of the switch apparatus, said plate 46 being normally held in its farthest position to the left by a light spring 47. The other end of said spring 47 abuts against a nut 48 on a sleeve 49 carried on the rod 44, said nut 48 having a washer 50 spacing it from an insulated ring 51 carried on the sleeve 49 and which supports two rod-shaped terminals 52 and 53 connected to said lead 37 and 36 respectively. The copper plate 46 is designed to initially close the circuit manually between the said two rods 52 and 53. The right-hand end of the rod 52 and 53 have screw-threaded thereto conducting plates 54 and 55 which are designed, in the automatic operation of the apparatus, to close the circuit with a copper disk 56 carried on a circuit-breaker sleeve 57 slidable within the sleeve 49 and normally held towards the right in Fig. 2 by a spring 58 to close the said circuit. It will be noted that the lead 36 is connected to one terminal 59 at one side of the motor 8 and the other lead 37 leads to any suitable source of electrical energy, as for example a battery, not shown, which latter is also connected by a lead 60 to a terminal 61 on said motor. The right-hand end of the rod 44 has a stop 62 cooperating with the interior of a shell 63 which is formed on the end of the circuit-breaker sleeve 57. This shell 63 is adapted to be moved for the automatic making and breaking of the pumping circuit by a ring 64 mounted on a cylindrical member 65 carrying within the same a snap action circuit breaking member 66, the inner left portion of which rests against a spring housing 67, having a spring 68 within the same carried on the outside of a sleeve 69 which overlies a rod 70, having a headed screw 71 and a washer 71a supporting near one end thereof a washer 72 held in place by a snap ring 72a to retain said spring 68 in place.

The said snap action circuit breaking member 66 cooperates with two bell-crank levers 73 and 74 having rollers 75 and 76 thereon, which latter are forced against the face of the cylindrical member 65 by springs 77, resting against extensions 78 on arms 79 on which the bell-crank levers 73 and 74 are carried by means of pivots 80. The arms 79 form a part of the switch housing 34. The rod 70, after passing through the snap action member 66, at the right thereof, carries a spring sleeve 81 having therein a spring 82 supported on a sleeve member 83 around the rod 70, which latter has a shoulder 84 supporting an end washer 85 to act as a retainer for said spring 82. The right-hand end of the rod 70 has a screw-thread 86 which is secured within the spring retainer plate 23 by means of nuts 87. Notches 88 in the face of the cylindrical member 65 also cooperate with said rollers 75 and 76 so as to retain the pump circuit broken when the pressure-liquid line is broken, that is to say when the piston 14 is at the extreme right-hand end of the cylinder 13. However, when the said liquid line is complete and the pump motor has been started manually by moving the copper plate 46 to the right, the pump will be started to supply the pressure liquid therefrom to the cylinder 12 and the piston 14 will move to the left, accordingly, until the snap action circuit-breaker 66 breaks the circuit when the desired pressure has been accumulated, so that, thus, liquid is supplied from the cylinder 12 through a port 89 and thence through radial ports 90 in a valve sleeve 91 which is normally kept in elevated position by means of a spring 92 carried in a cage 93 screw-threaded into the end of the cylinder 13. The lower end of the cage 93 has a slotted opening 94 to permit removal thereof, the same being covered with a screw-threaded apertured dust cap 95. Above the cage 93 there is a screw sleeve 95a, the adjusted position of the sleeve being maintained by a screw 96 cooperating with a series of slots 97 in said sleeve. This adjustment of the sleeve 95a also permits the tightening of an annular seal 98 located above a washer 99, the seal 98 being supported on the other face thereof by a spacing member 100 which rests against an apertured sleeve 101 within which the valve member 91 slides. A check valve 102 is carried within the valve member 91 and is held on its seat by a spring 103. The pressure liquid which is thus supplied by the force from the piston 14 is discharged past the check valve 102 and thence to a discharge port 104 leading to a pipe 105, this discharged pressure being a uniform pressure, preferably of about 500 lbs. per square inch.

Another discharge pipe 106 conveys the pressure liquid at this same pressure from the discharge port 104 to a fitting 107 in the upper end of a low-to-high pressure converter 108, Fig. 5, which fitting 107 also acts as a guide for a valve stem 109 of a valve 110 which is initially in its open position in the first part of the operation of the automotive accessory to be operated by the pressure liquid. This open position of the valve 110 is insured by a shoulder member 111 held in place by a snap ring 111a on the lower end of said valve, which shoulder member cooperates with the rear face of a plunger 112 secured by screw 113 to a piston 114 which operates within a cylinder 115 in the upper part of the low pressure converter 108. A sealing ring 116 is located between the plunger 112 and the piston 114. Thus, the lower end of the valve 110 is adapted to move within a cylindrical chamber 117 within the piston 114, having a communication port 117a with the cylinder 115, the shoulder member 111 being normally held in its upper position by a spring 118 to seat the valve 110 and located around a guide-rod 119 screw-threaded within the piston 114 at the lower end thereof. The lower end of said piston 114 carries a large piston 120 and a sealing ring 121 which operate within an enlarged cylinder 122, the lower end of which is closed by a screw-threaded cap 123 having clamping ears 124 held together with a bolt 125. Said cylinder has a retracting spring 122a for the pistons 114 and 120. A normally closed air bleeder screw 126 is carried in the lower face of the cap 123 and is removable from the screw 126a having an air escape port 126b to permit the escape of air. At the upper end of the enlarged cylinder 122 there are a plurality of breather openings 127. Each of these openings 127 carries a screw-threaded shell 128 having an air port 129, said shell being secured by a screw-thread and cotter-pin 130 to a cover 131 filled with horsehair 132 so as to convey the filtered air therethrough to a tube 133 leading to an inlet port 134 and the cylinder 122. The pressure liquid thus passes through the normally open valve 110 to an outlet pipe 135 and thence to a high pressure inlet port 136 in a modulator valve having a casing 137.

The said modulator valve casing 137, Fig. 9, has secured to the upper end thereof, by means of a locking screw 138, a pedal bracket 139 provided with a pivot 140 for a foot treadle 141. The said treadle 141 has a boss 142 on the lower face thereof which bears upon a plunger 143 in the pedal bracket 139 and is protected from access of dust by a rubber boot 144.

Said modulator valve 154, Fig. 9, is slidable within a sleeve 155 having ports 156 communicating with a low pressure outlet port 157 connected by a pipe 158 to the reserve tank 1 by means of the port 3. An annular rubber seal 159 is provided between the sleeve 155 and the sleeve 147. Another annular seal 160 is located on the other side of the sleeve 155 adjacent to a metallic spacing member 161, adjacent to which there is a seal 161a and a ported sleeve 162 having a seal 163 communicating with the pressure liquid port 136. Adjacent to said seal 163 there is a ported sleeve 164 which leads to a modulated pressure port 165. It will be noted that the spacing member 161 has a valve seat 166 to cooperate with a conical valve 167 on the cylindrical valve 154. Also on the outside of said cylindrical valve 154 there is an annular recess 168 communicating with ports 169 therein leading to a longitudinal passageway 170 in the said valve 154. A strong spring 171 normally moves the cylindrical valve 154 to seat the valve 167 against its seat 166. The disk valve 152 is thus manually movable by the treadle 141 so that by first keeping the disk valve 152 closed manually on its seat 153 the cylindrical valve 154 may be moved downwardly, in Fig. 9, so as to open communication, past the valve 167, between the port 136 and the interior of said valve 154 and thence to the modulated pressure port 165.

The modulated pressure thus passes from the port 165 by a pipe 173 to a tubular T-block 174 having one branch 175 leading to the brake actuation apparatus, and which may be comprised of two tubular connections 176 and 177 leading, respectively, to brake operating devices 178 and 179. Each of the latter carries a piston 180, in a cylinder 181, which is connected by a rod 182 to the brake shoes in the usual way, the cylinder 178 or 179 being connected with a bracket 183 fastened to the frame of the automobile. If desired, a further tubular connection 184 may branch rearwardly from the tubular connections 176 and 177, for connecting the same with a trailer, for which purpose there may be a manual shut-off valve 185 having a flexible tubular connection 186 leading to a manual shut-off valve 187 which in turn is provided with a tubular connection 188 leading to tubular branches 189 and 190 leading, respectively, to brake-operating units 191 and 192 constructed like the brake-operating units 178 and 179.

When the modulated pressure provided through the pipe 173 has moved the brake shoes into their position for applying thereafter the braking force, the pressure in the pipe 175 will rise and this pressure takes effect through a pipe 193 connected to the T-block 174 which leads to a port 194 in a fitting 195 of a converter valve having at the other side thereof a normally closed air bleeder 196, Fig. 10. Within the fitting 195 there is a plunger 197 having an annular seal 198 movable within a cylindrical chamber 199, the other end of which has a screw sleeve 200 to act as an abutment for a spring 201 which normally forces the plunger 197 to the right, in Fig. 10. A rod 201a on the left end of the plunger 197 passes through the screw sleeve 200 and bears on a rod 202 constructed the same and having parts and valve connections the same as the rod 145. This fitting 195 is secured by screws 203 to a valve casing 204 constructed exactly the same and provided with the same kind of valve as in the valve casing 137 previously described. In this instance the valve within the casing 204 is moved by the pressure accumulated within the pipe 193 so as to keep the said valve open during the continuance of said pressure and thus, at that time, to transmit the pressure fluid received from the pipe 105 through said valve and thence through a pipe 205 to a port 206 in the cap 123 of the low-to-high pressure converter 108.

The low pressure liquid discharged from the valve casing 204 when the high pressure within the pipe 193 ceases, is discharged by a pipe 207 through a port 208 on the inlet side of the pump 7, which is also connected to the pipe 6. In this way, when the pressure in the pipe 205 has been applied, as above referred to, the piston 120 is moved upwardly, thus closing the valve 110 and the low pressure inlet into the cylinder 108, the construction of the valve 110 being such as to permit an ample flow of liquid past the same when open and so as to avoid wear on the seal for the valve 110. Thereafter the high pressure liquid produced by the low pressure converter 108 is supplied through the pipe 135 which is then modulated by the modulator valve in the casing 137 and thus delivered as modulated high pressure through the pipes 173 and 175 to the brakes so as to apply this high pressure to secure the braking effect on the brake shoes.

In the operation of my invention as shown in Fig. 1, when it is desired to put on the brakes or operate any other part of the automotive vehicle the pedal 141 is moved downwardly and the relatively low pressure liquid received through the port 136, due to the closure of the valve 152, is allowed to pass by the valve 167 in modulated amounts, thence through the port 169 and out through the port 165 to the pipes 173 and 175 and then to the brakes to initially move the brake shoes into position. When the pressure in these pipes accumulates to a higher pressure, this pressure reacts through the pipe 193 on to the converter valve 204 to keep the said valve open while this high pressure condition continues, the result of which is to cause the low pressure liquid received by said valve 204 from the pipe 105 to pass by the pipe 205 to the low pressure or large cylinder end of the low-to-high pressure converter 108, thereby closing the valve 110 and placing the liquid under high pressure in the cylinder 115, which is then discharged by the pipe 135 to be modulated by the modulator valve 137 and thence delivered in the form of high pressure by the pipes 173 and 175 to the brake shoes for producing the braking effect thereon. This braking pressure can be modulated, that is to say increased or decreased at will, according to the increments or partial release of the liquid in the pipes 173 and 175 by the valve 137. Upon the release of the pedal 141 the parts are restored to their initial positions, the exhaust liquid passing by the pipe 158 to the reserve tank 1 and from the valve 204 by the pipe 207 to the low pressure side of the pump 7. Throughout the operation, as described above, the accumulator 11 will maintain therein a body of liquid under the minimum desired pressure, which may be approximately 100 lbs. per square inch, ready to be utilized whenever desired upon the actuation of the pedal 141. By this means a relatively low pressure is provided for initially setting the brakes, followed by modulated high pressure for applying the braking force. Also, if desired, the brakes can be operated by the manual force through the continuous body of the hydraulic fluid to the brakes in case of failure of the other liquid pressures.

While I have described my invention above in detail I wish it to be understood that many changes may be made therein without departing from the spirit of the same.

I claim:

1. A low pressure converter comprising a hydraulic line leading to the converter, a conduit leading from the converter for moving a work-performing device, a relatively low liquid pressure supply constructed and arranged to supply liquid to said line under superatmospheric pressure, a large piston and a smaller piston connected together, cylinders for said pistons each of which has a separate inlet, said line having branches leading to said inlets, a pressure responsive valve controlled by the pressure in the conduit, said valve being located in the branch leading to the large cylinder, and a valve having a lost-motion connection to said first mentioned piston and operable thereby, adapted to close said line by the movement of the pistons, said pressure responsive valve being responsive to a predetermined pressure in the conduit to admit fluid from the source to the large cylinder to act on the pistons and thereby close the valve connected to the pistons, said pistons thereafter intensifying the pressure of the liquid in the small cylinder, said pistons being spring pressed towards their withdrawn position.

2. A low pressure converter comprising a hydraulic line leading to the converter, a conduit leading from the converter for moving a work-performing device, a relatively low liquid pressure supply constructed and arranged to supply liquid in said line under superatmospheric pressure, a large piston and a smaller piston connected together, cylinders for said pistons each of which has a separate inlet, said line having branches leading to said inlets, a pressure responsive valve controlled by the pressure in the conduit, said valve being located in the branch leading to the large cylinder, and a valve having a lost-motion connection to said first mentioned piston and operable thereby, adapted to close said line by the movement of the pistons, said pressure responsive valve being responsive to a predetermined pressure in the conduit to admit fluid from the source to the large cylinder to act on the pistons and thereby close the valve connected to the pistons, said pistons thereafter intensifying the pressure of the liquid in the small cylinder, said pistons being spring pressed towards their withdrawn position and said conduit having a control valve therein for controlling the liquid supplied through said conduit for work-performance.

3. A low pressure converter comprising a hydraulic line leading to the converter, a conduit leading from the converter for moving a work-performing device, a relatively low liquid pressure supply constructed and arranged to supply liquid to said line under superatmospheric pressure, a spring-retracted large piston and a smaller piston connected together, cylinders for said pistons each of which has a separate inlet, said line having branches leading to said inlets, a pressure responsive valve controlled by the pressure in the conduit, said valve being located in the branch leading to the large cylinder, the small cylinder having located at its outer end its inlet and a connection to said conduit, and a valve having a lost-motion connection to said first mentioned piston and operable thereby, adapted to close said line by the movement of the pistons, said pressure responsive valve being responsive to a predetermined pressure in the conduit to admit fluid from the source to the large cylinder to act on the pistons and thereby close the valve connected to the pistons, said pistons thereafter intensifying the pressure of the liquid in the small cylinder.

4. A low pressure converter comprising a hydraulic line leading to the converter, a conduit leading from the converter for moving a work-performing device, a relatively low liquid pressure supply constructed and arranged to supply liquid to said line under superatmospheric pressure, a spring-retracted large piston and a smaller piston connected together, cylinders for said pistons each of which has a separate inlet, said line having branches leading to said inlets, a pressure responsive valve controlled by the pressure in the conduit, said valve being located in the branch leading to the large cylinder, the small cylinder having located at its outer end its inlet and a connection to said conduit, and a valve having a lost-motion connection to said first mentioned piston and operable thereby, adapted to close said line by the movement of the pistons, said pressure responsive valve being responsive to a predetermined pressure in the conduit to admit fluid from the source to the large cylinder to act on the pistons and thereby close the valve connected to the pistons, said pistons thereafter intensifying the pressure of the liquid in the small cylinder and said conduit having a control valve therein for controlling the liquid supplied through said conduit for work-performance.

5. A low pressure converter comprising a hydraulic line leading to the converter, a conduit leading from the converter for moving a work-performing device, a relatively low liquid pressure supply constructed and arranged to supply liquid to said line under superatmospheric pressure, a large piston and a smaller piston connected together, cylinders for said pistons each of which has a separate inlet, said line having branches leading to said inlets, a pressure responsive valve controlled by the pressure in the conduit, said valve being located in the branch leading to the large cylinder, and a valve having a lost-motion connection to said first mentioned piston and having a valve-seating spring within the small piston having its base seated on the large piston, adapted to close said line by the movement of the pistons, said pressure responsive valve being responsive to a predetermined pressure in the conduit to admit fluid from the source to the large cylinder to act on the pistons and thereby close the valve connected to the pistons, said pistons thereafter intensifying the pressure of the liquid in the small cylinder, said pistons being spring pressed towards their withdrawn position and said valve having a valve seat on the small cylinder.

6. A low pressure converter comprising a hydraulic line leading to the converter, a conduit leading from the converter for moving a work-performing device, a relatively low liquid pressure supply constructed and arranged to supply liquid to said line under superatmospheric pressure, a large piston and a smaller piston connected together, cylinders for said pistons each of which has a separate inlet, said line having branches leading to said inlet, a pressure responsive valve controlled by the pressure in the conduit, said valve being located in the branch leading to the large cylinder, and a valve having a lost-motion connection to said first mentioned piston and having a valve-seating spring within the small piston having its base seated on the large piston, adapted to close said line by the movement of the pistons, said pressure responsive valve being responsive to a predetermined pressure in the conduit to admit fluid from the source to the large cylinder to act on the pistons and thereby close the valve connected to the pistons, said pistons thereafter intensifying the pressure of the liquid in the small cylinder, said smaller piston being spring pressed towards the withdrawn position and said valve having a valve seat to control the inlet on the small cylinder.

7. A low pressure converter comprising a hydraulic line leading to the converter, a conduit leading from the converter for moving a work-performing device, a relatively low liquid pressure supply constructed and arranged to supply liquid to said line under superatmospheric pressure, a spring-retracted large piston and a smaller piston connected together, cylinders for said pistons each of which has a separate inlet, said line having branches leading to said inlets, a pressure responsive valve controlled by the pressure in the conduit, said valve being located in the branch leading to the large cylinder, and a valve having a lost-motion connection to said first mentioned piston and operable thereby, adapted to close said line by the movement of the piston, said pressure responsive valve being responsive to a predetermined pressure in the conduit to admit fluid from the source to the large cylinder to act on the pistons and thereby close the valve connected to the pistons, said pistons thereafter intensifying the pressure of the liquid in the small cylinder, the said two cylinders having bores which are made in one piece, and said valve having a valve seat to control the inlet on the small cylinder.

8. A low pressure converter comprising a hydraulic line leading to the converter, a conduit leading from the converter for moving a work-performing device, a relatively low liquid pressure supply constructed and arranged to supply liquid to said line under superatmospheric pressure, a spring-retracted large piston and a smaller piston connected together, cylinders for said pistons each of which has a separate inlet, said line having branches leading to said inlets, a pressure responsive valve controlled by the pressure in the conduit, said valve being located in the branch leading to the large cylinder, and a valve having a lost-motion connection to said first mentioned piston and operable thereby, adapted to close said line by the movement of the pistons, said pressure responsive valve being responsive to a predetermined pressure in the conduit to admit fluid from the source to the large cylinder to act on the pistons and thereby close the valve connected to the pistons, said pistons thereafter intensifying the pressure of the liquid in the small cylinder, the said two cylinders having bores which are made in one piece, and said valve having a valve seat to control the inlet on the small cylinder.

EDWARD A. ROCKWELL.

REFERENCES CITED

The following references are of record in the file of this patent:

UNITED STATES PATENTS

| Number | Name | Date |
| --- | --- | --- |
| 1,550,089 | Mattingly | Aug. 18, 1925 |
| 1,847,604 | Finsen | Mar. 1, 1932 |
| 1,885,235 | Davis | Nov. 1, 1932 |
| 1,887,880 | Avery | Nov. 15, 1932 |
| 1,938,979 | Sawtelle | Dec. 12, 1933 |
| 2,162,797 | Boldt | June 20, 1939 |
| 2,308,712 | Peterson | Jan. 19, 1943 |

FOREIGN PATENTS

| Number | Country | Date |
| --- | --- | --- |
| 769,257 | France | June 5, 1934 |